United States Patent
Goebel et al.

(10) Patent No.: US 6,664,917 B2
(45) Date of Patent: Dec. 16, 2003

(54) SYNTHETIC APERTURE, INTERFEROMETRIC, DOWN-LOOKING, IMAGING, RADAR SYSTEM

(75) Inventors: Robert H. Goebel, Wildwood, MO (US); David C. Toretta, Chesterfield, MO (US); Stacie K. Corrubia, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/051,399

(22) Filed: Jan. 17, 2002

(65) Prior Publication Data

US 2003/0132875 A1 Jul. 17, 2003

(51) Int. Cl.$^7$ ................................................ G01S 13/00
(52) U.S. Cl. .............................. 342/64; 342/25; 342/59; 342/61; 342/63
(58) Field of Search ........................... 342/25, 195, 59, 342/61, 62, 63, 64

(56) References Cited

U.S. PATENT DOCUMENTS

| | | | | |
|---|---|---|---|---|
| 4,359,732 A | | 11/1982 | Martin | |
| 4,924,229 A | * | 5/1990 | Eichel et al. | 342/25 |
| 5,048,950 A | * | 9/1991 | Metzdorff et al. | 342/25 |
| 5,170,171 A | | 12/1992 | Brown | |
| 5,260,708 A | | 11/1993 | Auterman | |
| 5,262,781 A | * | 11/1993 | Evans | 342/25 |
| 5,430,445 A | * | 7/1995 | Peregrim et al. | 342/25 |
| 5,867,119 A | | 2/1999 | Corrubia et al. | |
| 6,114,984 A | * | 9/2000 | McNiff | 342/62 |
| 6,166,677 A | * | 12/2000 | Kikuchi et al. | 342/140 |
| 6,362,775 B1 | * | 3/2002 | Goebel et al. | 342/175 |
| 6,400,306 B1 | * | 6/2002 | Nohara et al. | 342/160 |

* cited by examiner

Primary Examiner—Thomas H. Tarcza
Assistant Examiner—Brian Andrea
(74) Attorney, Agent, or Firm—Black Lowe & Graham PLLC

(57) ABSTRACT

A surface imaging radar system for an airborne platform, the system comprises a transmitter for generating a radar signal. The system also comprises an antenna configured to transmit a radar signal generated by the transmitter and receive radar return information from one or more directions directly below the airborne platform to an angular direction of approximately 30 degrees greater than straight down. The system also includes a processor configured to generate surface information based on the received radar return information and an image processor for generating an image based on the surface information.

15 Claims, 4 Drawing Sheets

SYNTHETIC APERTURE, INTERFEROMETRIC, DOWN-LOOKING, IMAGING, RADAR SYSTEM

FIELD OF THE INVENTION

This invention relates generally to radar and, more specifically, to terrain imaging radars.

BACKGROUND OF THE INVENTION

Systems that use radar to extract information about the surroundings have been used for many years. These include systems that provide range measurement, altimetry, angle measurements, synthetic aperture radar (SAR) imagery for the horizontal extent of a terrain/surface and three-dimensional interferometric SAR terrain mapping.

Systems that provide terrain contour mapping have been used for moving platforms such as airplanes and missiles. For example, U.S. Pat. No. 5,170,171 incorporated herein by reference in its entirety, describes a system for three-dimensional interferometric SAR terrain mapping employing altitude measurement. In such systems, SAR data is used in combination with separately generated altimeter data to produce a terrain map corrected for aircraft roll angle. In general, such systems use two synthetic radar antennas for transmission at shallow grazing angles and a downward pointed ranging altimeter located on the airborne platform.

Another system that is able to provide a terrain map is disclosed in U.S. Pat. No. 5,260,708, also incorporated herein by reference in its entirety. In this system, a three-dimensional interferometric SAR terrain-mapping system is described in which unambiguous phase unwrapping employing subset bandwidth processing is used. As with the system of the '171 patent, this system employs two radar receivers which process echo signals conventionally to yield slant range and Doppler frequency data for plural resolution cells. The measured phase difference for each resolution cell provides an ambiguous measure of slant range difference to the two antennas needed to determine terrain elevation and correct ground range. The received echo data is reprocessed using less than the entire bandwidth of the radar transmission to achieve additional center wavelengths. This produces a differing ambiguity interval and permits unambiguous determination of the slant range difference. The average altitude is separately determined by a ranging altimeter.

Other topographical mapping radar systems, such as disclosed in U.S. Pat. No. 4,359,732, incorporated herein by reference in its entirety, use two vertically spaced fan beam antennas to provide terrain contour mapping. This radar transmission is normal to the flight path and to the side of the airborne platform.

A radar apparatus that looks downward in a synthetic aperture, interferometric mode is disclosed in U.S. Pat. No. 5,867,119, also incorporated herein by reference in its entirety. This system is designed to provide precision height measurements and does not provide images of the scene below the radar.

Although such systems have been used in mapping terrain, their accuracy is somewhat limited by the accuracy of the separately generated altimeter information. They also typically provide mapping at a considerable distance to the side of the airborne platform, thereby requiring significant power. High-powered radar signals are undesirable emissions from military aircraft and missiles because they are easily detectable by enemy surveillance equipment. Therefore, such signals must not be constantly on—that is, have a duty cycle of 1. Therefore, a need exists for reducing the power of terrain mapping radar signals in order to make airborne platforms and missiles more resistant to enemy systems. There also exists a need to provide more accurate and useful altimeter information.

SUMMARY OF THE INVENTION

The present invention is a system for performing surface imaging of the surface below an airborne platform. The system includes an antenna that transmits a radar signal and receives radar return information from one or more directions directly below the airborne platform to an angular direction of approximately 30 degrees forward of straight down. The system also includes a processor that generates surface map information based on the received radar return information. The generated surface map information includes down-track information, cross-track information, and range information relating to the airborne platform's position relative to the surface. Because the signals are pointed downward, less power is required to transmit the radar signals. Because less power is required, detection by enemy systems is more difficult. This allows the radar of the present invention to always be on or on more than in the past.

In accordance with further aspects of the invention, an image processor generates an image based on the down-track, cross-track, and range information.

In accordance with other aspects of the invention, a guidance system generates guidance information based on the down-track, cross-track, range information, and a previously stored reference map.

The present invention is preferably related to a radar apparatus used on an airborne platform to provide information about the surroundings of the platform. In general, the invention relates to a system that transmits and receives electromagnetic energy, modulates the transmitted energy and extracts information from the received energy to establish knowledge of its physical surroundings in three-dimensional space. In particular, the invention relates to a system that transmits energy in a generally downward direction and provides precise three-dimensional pixel location of each element of the surface and a three-dimensional image of the scene below or up to 30 degrees forward of the platform. The system then compares the three-dimensional image information to stored data to provide automatic guidance.

BRIEF DESCRIPTION OF THE DRAWINGS

The preferred and alternative embodiments of the present invention are described in detail below with reference to the following drawings.

DETAILED DESCRIPTION OF THE INVENTION

Vertical Extent Imaging Apparatus

Figure 1:
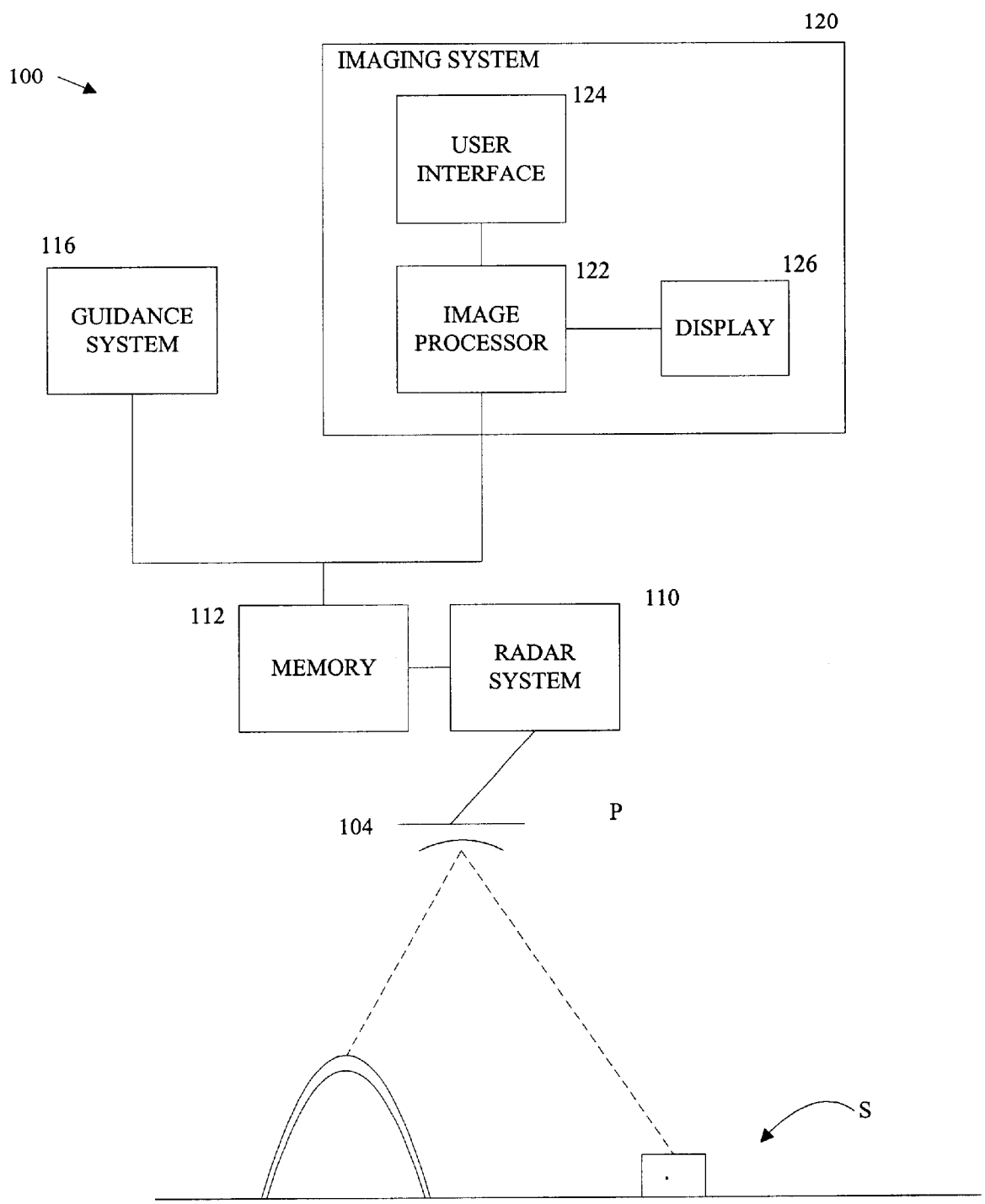
FIG. 1 is a block diagram of an example system formed in accordance with the present invention.

Referring to FIG. 1, a block diagram of one embodiment of a precision height measuring apparatus 100 according to the invention is illustrated. The apparatus 100 measures a distance R between a platform P and a surface location S. The relationships between the platform P and the surface location S is not to scale and somewhat exaggerated in order to clearly illustrate these aspects of the invention. An antenna 104 is adapted to be positioned at the platform P and directed downwardly toward the surface location S preferably directed straight down to 30 degrees forward. A transmitter transmits a signal through the antenna 104 toward the surface location S.

The signal radiated by the antenna 104 is directed downwardly toward the surface S which reflects the radiated signal. The reflected signal received by the antenna 104 is sent to a radio frequency (rf) amplifier via a transmit/receive switch for amplification and signal conditioning and further processing by a coherent detector. The detector generates an in-phase component I and a quadrature component Q of the reflected signal.

The in-phase and quadrature are analog components and are provided to an analog to digital (A/D) converter which converts them into digital signals.

The digital signal processor processes in real time the in-phase component I and quadrature component Q from the converter by a Doppler filtering technique (as is known in the art) to determine the down-track value/location DT of each scanned surface location. In addition, the processor processes in real time the in-phase component I and quadrature component Q by threshold processing to determine a range R corresponding to the distance between the platform P and each scanned location of the surface S. These operations in total generate the two-dimensional location in a vertical plane of each scanned surface location relative to the platform P.

The digital information produced by the converter is stored directly in memory or is sent to the processor for processing then storing in the memory. The memory is preferably volatile (RAM) memory.

Figure 2:
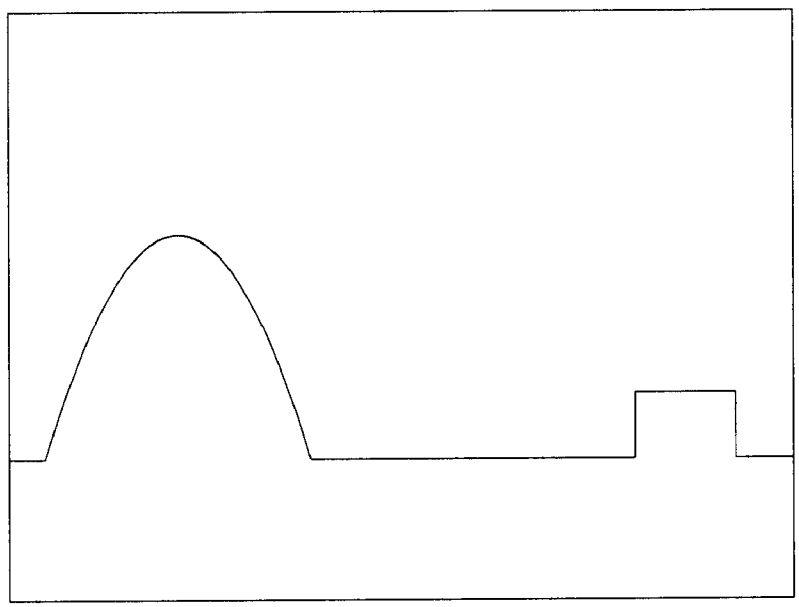
FIG. 2 is a simulated image generated by the system of FIG. 1.

Preferably, the moving platform P is an airplane, rocket, missile, or other vehicle moving over the surface such as the earth's surface. In a first alternate embodiment, an imaging system 120 receives the R and DT values. The imaging system 120 includes an image processor 122, a user interface 124, and a display 126. The image processor 122 generates an image using the received R and DT values based on any signals generated by the user interface 124. The generated image is then displayed for flight crew viewing on the display 126. FIG. 2 illustrates an example side-view image generated by the processor 122 based on the scanned surface S shown in FIG. 1.

In a second alternative embodiment, a guidance system 116 uses the information provided by the processor 122 to perform surface avoidance, target attack, remote landing, or other guidance related tasks. An example of the guidance system is a missile guidance system. The guidance system 116 typically includes an inertial guidance component. The guidance system 116 matches a three-dimensional (3-D) database of the surface the missile will overfly to the information generated by the processor in order to determine guidance instructions for the platform's navigating system.

Although the system of the invention has been described with particular regard to its use as a downward looking imaging device, those skilled in the art will recognize other applications of the system. For example, the device of the invention may be used to monitor changes in height of various structures. In addition, the system of the invention is useful to provide a high-resolution position location technique.

Synthetic, Interferometric, Down-looking Imaging Apparatus

Figure 3:
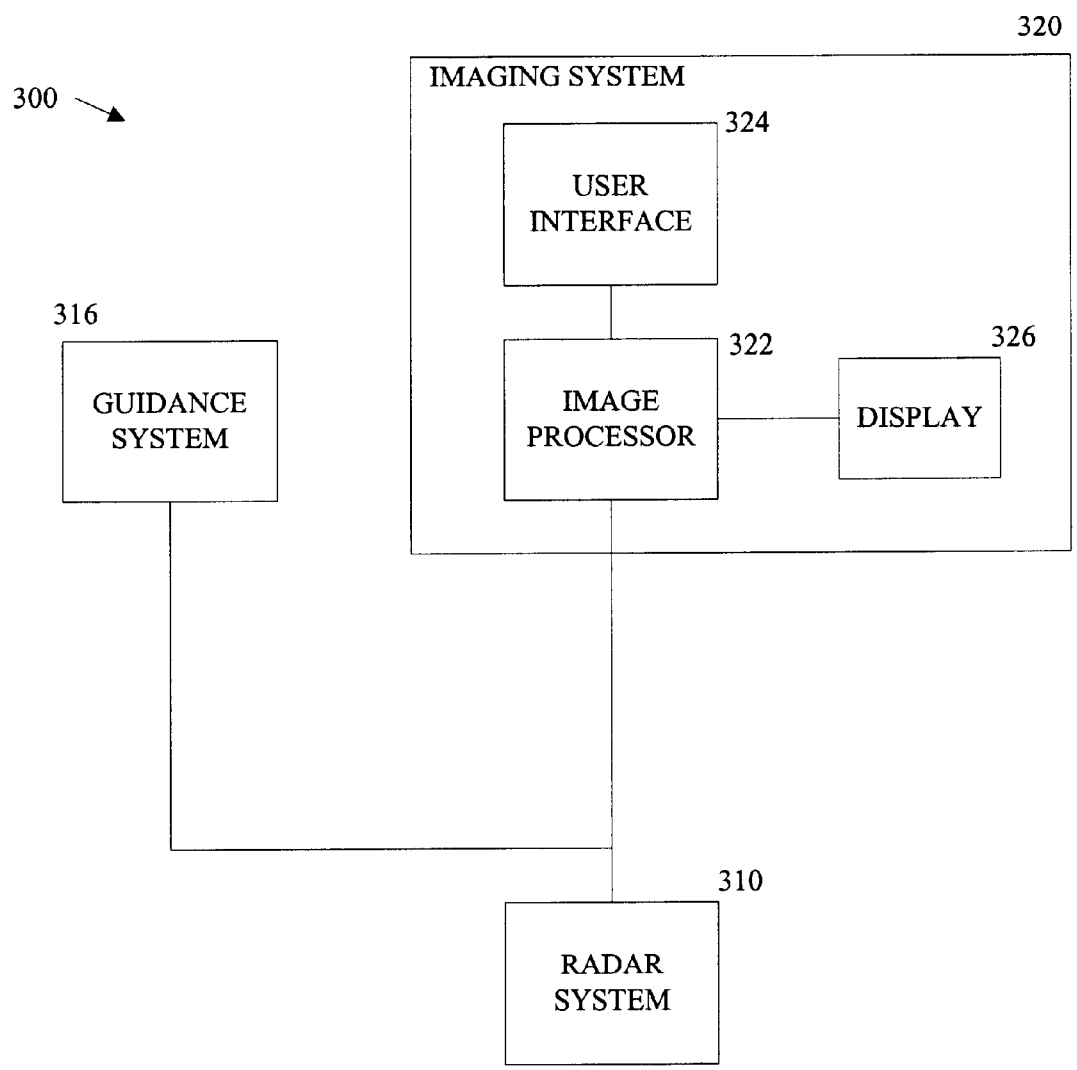
FIG. 3 is a block diagram of an alternate of the present invention.

In a second embodiment, a three-dimensional image is created using data generated by a synthetic aperture, interferometric, down-looking (SAID) radar system 310 as depicted in FIG. 3 and as described in U.S. Pat. No. 5,867,119, hereby incorporated by reference. Range (z), down-track (y) DT location, and cross-track offset (x) CT information generated by the SAID radar system 310 is used by an imaging system 320 to produce a three-dimensional view (image) of a surface or by a guidance system 316 to generate guidance information. Doppler processing is also used by the system 310 to generate the DT location of each scanned surface location.

The three-dimensional information (R, DT, CT) of each resolvable element/location on the surface relative to the airborne platform is sent to the imaging system 320, the guidance system 316, or to other internal or external operation systems. The imaging system 320 includes an image processor 322, a user interface 324, and a display 326. The image processor 322 generates three-dimensional images using the three-dimensional information based on platform position information generated by a navigation system and viewing angle control information generated automatically or by user manipulation of the user interface 324. The generated image is then presented on the display 326.

Figure 4:
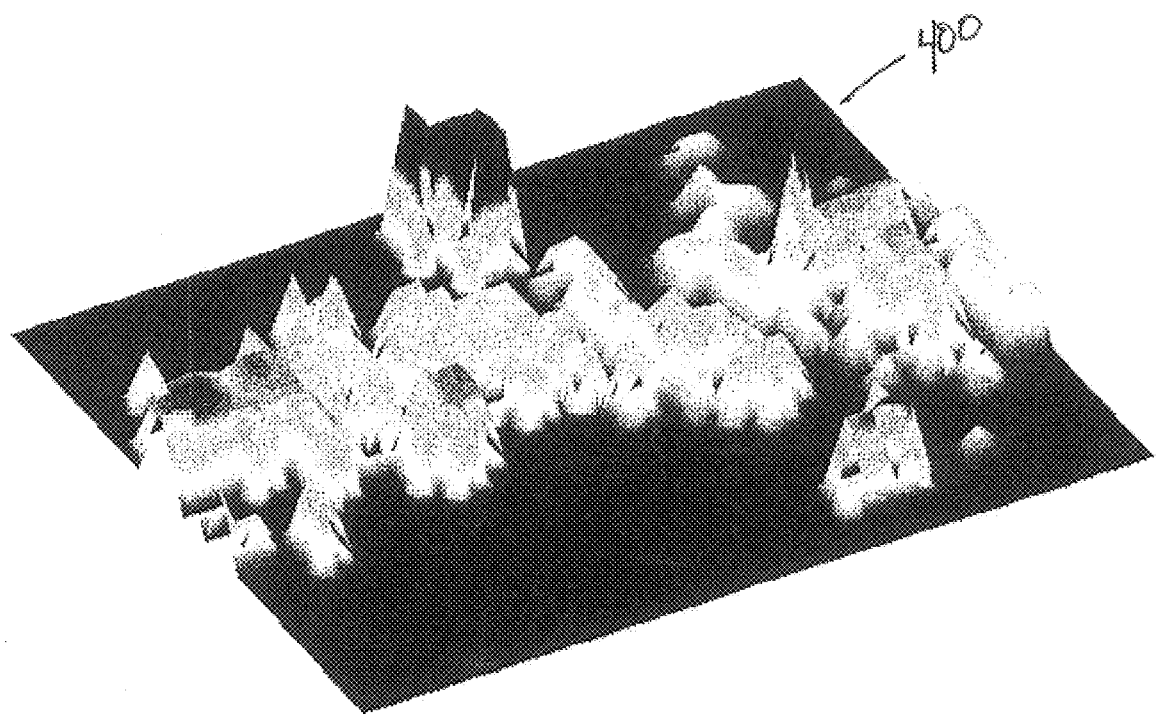
FIG. 4 is a simulated image generated by the system shown in FIG. 3.

FIG. 4 illustrates an image 400 that would be generated by the imaging system 320 after a radar scan of a surface. Because the stored information used to generate the image 400 is three-dimensional information, the imaging system 320 can generate images with any of a number of different points of view of the surface radar return data. The generated image is presented to a pilot, which allows the pilot to easily determine what obstacles exist below the airborne platform.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A surface imaging radar system for an airborne platform, the system comprising:
   a transmitter configured to generate a radar signal;
   an antenna configured to transmit a radar signal generated by the transmitter and receive radar return information of the transmitted radar signal from one or more directions directly below the airborne platform to an angular direction of approximately 30 degrees forward of straight down;
   a processor configured to generate surface information based on the received radar return information, wherein the generated surface information includes down-track information and range information of the airborne platform relative to the surface;
   an image processor for generating an image based on the down-track and range information; and
   a display for displaying the generated image.

2. The system of claim 1, further comprising memory configured to store the generated surface information.

3. The system of claim 1, further comprising a guidance system for generating guidance information based on the down-track and range information, and a prestored reference map.

4. The system of claim 1, further comprising a second antenna configured to receive radar return information of the transmitted radar signal, wherein the processor generates surface information based on the received radar return information from both antennas, and the generated surface information further comprises cross-track information of the airborne platform relative to the surface.

5. The system of claim 4, further comprising an image processor for generating an image based on the down-track, cross-track, and range information.

6. The system of claim 4, further comprising a guidance system for generating guidance information based on the down-track, cross-track, range information, and a prestored reference map.

7. The system of claim 4, further comprising a guidance system for performing at least one of surface avoidance, target attack, or remote landing based on the down-track, cross-track, and range information.

8. A surface imaging radar method for an airborne platform, the method comprising:

generating a radar signal;

transmitting the generated radar signal;

receiving radar return information at an antenna corresponding to the transmitted radar signal from one or more directions directly below the airborne platform to an angular direction of approximately 30 degrees forward of straight down from the airborne platform;

generating surface information based on the received radar return information, wherein the generated surface information includes down-track information and range information of the airborne platform relative to the surface;

generating an image based on the down-track and range information; and displaying the generated image.

9. The method of claim 8, further storing the generated surface information.

10. The method of claim 8, further comprising generating guidance information based on the down-track and range information, and a prestored reference map.

11. The method of claim 8, further comprising receiving radar return information of the transmitted radar signal at a second antenna, wherein the generated surface map information is based on the received radar return information from the first and second antennas, and the generated surface information further comprises cross-track information of the airborne platform relative to the surface.

12. The method of claim 11, further comprising generating an image based on the down-track, cross-track, and range information.

13. The method of claim 11, further comprising generating guidance information based on the down-track, cross-track, range information, and a prestored reference map.

14. The method of claim 11, further comprising performing at least one of surface avoidance, target attack, or remote landing based on the down-track, cross-track, and range information.

15. A surface mapping radar system for an airborne platform, the system comprising:

a transmitter configured to generate a radar signal;

an antenna configured to transmit a radar signal generated by the transmitter and receive radar return information from one or more directions directly below the airborne platform to an angular direction of approximately 30 degrees forward of straight down;

an amplifier configured to amplify the received radar return information;

a coherent detector configured to detect a magnitude component and a first phase difference component of the amplified information;

an analog-to-digital converter configured to digitize the magnitude and first phase difference components;

a processor configured to generate surface information based on the digitized magnitude and first phase difference components; and a display for displaying the generated surface information.

* * * * *